DISTRIBUTED AMPLIFIER

Original Filed Sept. 26, 1966

INVENTOR
ETHRIDGE C. BEST
BY Richard J. Seligman
ATTORNEY

United States Patent Office 3,497,825

Patented Feb. 24, 1970

3,497,825

DISTRIBUTED AMPLIFIER

Ethridge C. Best, Nashua, N.H., assignor to Sanders Associates Inc., Nashua, N.H., a corporation of Delaware Continuation of application Ser. No. 581,860, Sept. 26, 1966. This application May 19, 1969, Ser. No. 827,119

Int. Cl. H03f *3/60*

U.S. Cl. 330—54 7 Claims

ABSTRACT OF THE DISCLOSURE

A distributed amplifier is herein disclosed comprising means for separating a broadband signal into narrow-bandwidth components, a plurality of narrow-bandwidth amplifiers to amplify the narrow-bandwidth components and means for combining said amplified components into a composite signal which is an amplified version of original broadband signal.

Figure 2:
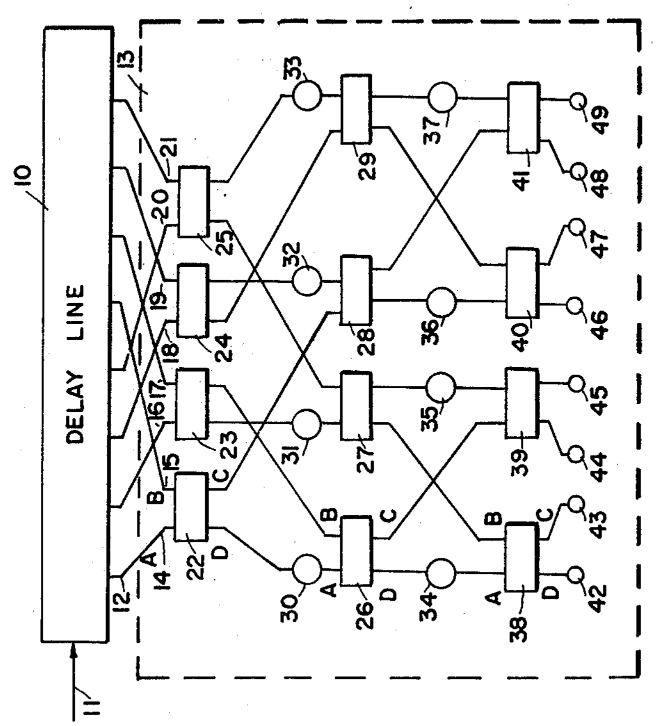

This application is a continuation of application No. 581,860, filed Sept. 26, 1966, now abandoned.

This invention relates to distributed amplifiers and, more particularly, to distributed amplifiers employing signal separation and combination networks comprising broadband transmission line couplers and phase shifters.

The maximum bandwidth attainable with ordinary video amplifiers is limited by the gain-bandwidth product of the amplifier, this product value being relatively constant, depending upon the particular amplifier employed. Since the gain-bandwidth product is a constant, an increase in bandwidth is accompanied by a corresponding decrease in gain; and, since the voltage gain of each stage must exceed unity if the amplifier is to be useful, the bandwidth attainable has an upper limit.

To overcome this bandwidth limitation, the distributed amplifier is employed. Conventional distributed amplifiers consist of vacuum tubes distributed along artificial transmission lines, such that the tubes act in parallel as far as their plate currents are concerned, while tube capacitances do not act in parallel. For practical purposes, the conventional distributed amplifier design has an upper frequency limitation of the order of 500 megacycles per second. Generally, at these frequencies, triodes, tetrodes, etc., are employed, which have relatively narrow bandwidths. At higher frequencies, the travelling wave tube (TWT) amplifier can amplify greater bandwidth signals, but only in low-power applications, the power limit usually not exceeding a kilowatt.

Accordingly, it is an object of this invention to provide an improved distributed amplifier eliminating the disadvantage of the above-mentioned prior art distributed amplifier.

It is another object of this invention to provide a distributed amplifier having an upper frequency limitation well in excess of 500 megacycles per second.

It is an additional object of this invention to provide a distributed amplifier having a bandwidth greater than one octave.

It is still another object of this invention to provide a distributed amplifier for applications where very high power is required at high frequencies over a broadbandwidth.

In carrying out one embodiment of this invention, a plurality of narrow-bandwidth high-frequency amplifiers, each having a high gain and each covering successive portions of a broad band to be amplified, is employed. The individual narrow-bandwidth amplifiers are coupled between input and output matrices or transmission line networks, comprising broadband transmission line couplers and phase shifters. These matrices can be designed with useful bandwidths in excess of an octave. The input signal is coupled via a tapped delay line to the input matrix, and the output signal is derived from the output matrix, utilizing a second tapped delay line.

The transmission line couplers and phase shifters of the input matrix are arranged such that the input signals energize a series of input ports of the input matrix with equal amplitudes and a uniform phase shift, and appear at respective output ports of the input matrix contingent upon respective frequencies of the input signals. That is, the matrix is employed as a multiple filter bank, with each output port being excited by a different frequency. Similarly, the signals appearing at the output ports of the input matrix are, after amplification, applied to the output matrix which has its input and output ports opposite that of the input matrix, such that the individual signals are applied to the input ports of the output matrix and derived at the output ports thereof as a signal which, when applied to the taps of the second delay line, is derived at the output thereof as an amplified version of the original signal.

In this manner, the property inherent in travelling wave tube or cross-field amplifiers, namely high gain at narrow bandwidth, is combined with the filtering properties of the transmission line networks to provide high amplification at wide bandwidths, each high-gain narrow-bandwidth amplifier being used to amplify selected filtered portions of a total signal broadband in scope, but broken down into narrowband components.

Furthermore, by coupling unequal amounts of power to the input matrix, various tapering of the signal occurs, causing the deletion of often unwanted "side lobes," thus providing a response envelope equivalent to that of a two-pole filter, rather than that of a single-pole filter, which is attained when the input matrix is uniformly excited.

Figure 1:
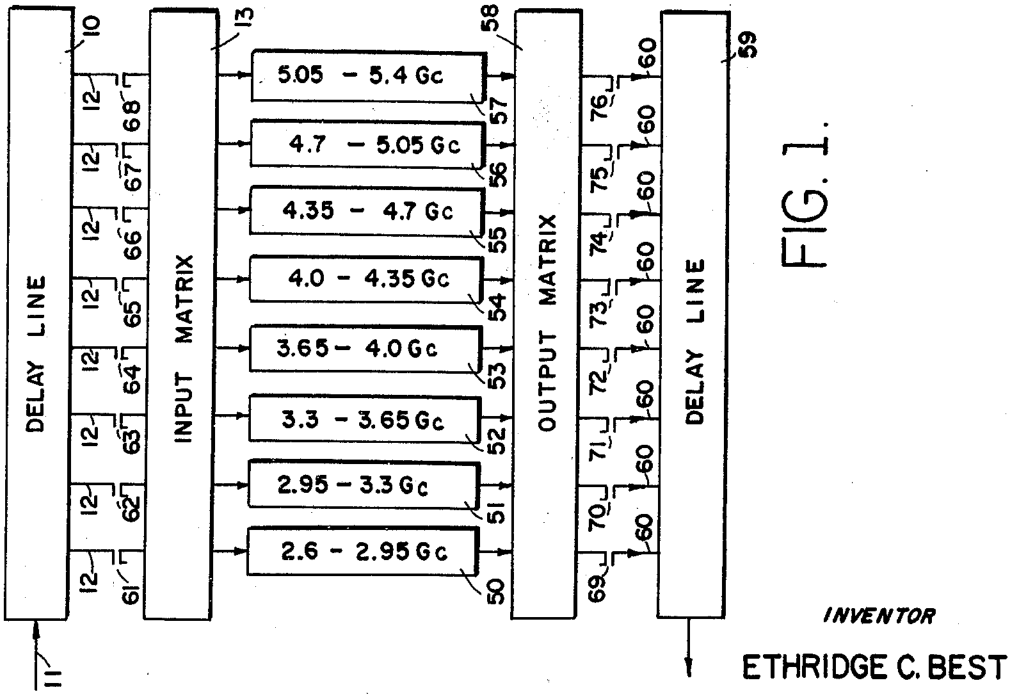

The above-mentioned and other features and objects of this invention will become more apparent by reference to the following description, taken in conjunction with the accompanying drawings, in which:

FIG. 1 is a block diagram illustrating an embodiment of a distrbiuted amplifier; and FIG. 2 is a schematic representation of the input matrix of FIG. 1.

Referring now to FIG. 1, the present distributed amplifier includes a tapped delay line 10 at the input 11 of which radio frequency signals to be amplified are applied. Delay line 10 has a plurality of outputs 12 which are coupled via a plurality of couplers 61–68 to a transmission line network designated as input matrix 13.

Input matrix 13, taken in conjunction with delay line 10, is similar to apparatus described in the patent of E. C. Best et al., No. 3,135,917, for "Frequency Sensitive Wave Analyzer Including Frequency Sensing Phase Shifting Means," assigned to the assignee of this application.

Referring to FIG. 2, there is illustrated an embodiment of input matrix 13 constructed according to the teachings of Patent No. 3,135,917. A signal fed from tapped delay line 10 to input matrix 13 energizes a progression of input ports 14 through 21 with equal amplitudes and uniform phase differences. The transmission paths through matrix 13 are unique, depending upon the phase difference between the input ports, the latter parameter varying with the frequency of the input signal. Since the path through the matrix thus varies with frequency, the signals delivered to the respective output ports 42 through 49 have different amplitudes depending upon frequency. By observing the signal amplitude at the output ports, the frequency is therefore identified.

Since particular frequencies are derived at particular output ports, the matrix is, in effect, a filter network.

The signals from the taps of delay line 10 are applied to the input ports 14 through 21 of matrix 13. The signals from input ports 14–21 are fed to a plurality of couplers 22 through 25. Couplers 22 through 25 are four-port 3 db directional couplers having fixed phase shifts between their ports.

A signal fed to one of the four ports of a coupler is divided into two equal output signals appearing at the opposite ports. The output signals differ in relative phase by 90°, with the output diagonally opposite the input port having the greater delay. For example, a signal fed to port A of coupler 22 is coupled equally to ports C and D, with the signal delivered to port C delayed 90° in phase with respect to the signal delivered to port D. Preferably, the couplers are of the quarter-wavelength parallel line type.

Still referring to FIG. 2, the input ports 14 and 15 of matrix 13 are connected to the coupler 22; the input ports 16 and 17 are connected to the coupler 23; the input ports 18 and 19 are connected to the coupler 24; and the input ports 20 and 21 are connected to the coupler 25. A second series of four-port couplers 26 through 29 is coupled to the first series of couplers 22–25, as follows.

The A port of coupler 26 is coupled to the D port of coupler 22 via a phase shifter 30, and the B port of coupler 26 is connected to the C port of coupler 23. The A port of coupler 27 is coupled to the D port of coupler 23 via a phase shifter 31, and the B port of coupler 27 is connected to the D port of coupler 25. Couplers 28 and 29 are connected to couplers 22 through 25 via phase shifters 32 and 33 in like manner, as shown in FIG. 2 of the drawings. A third set of couplers 38 through 41 is coupled to the second set of couplers 26 through 29 directly and via a second set of phase shifters 34 through 37, as illustrated in the drawings. The D and C ports of couplers 38 through 41 are connected to the output ports 42 through 49 of matrix 13.

More generally, in a network having $2^m$ input ports, where *m* is any positive integer, the input signal is coupled exclusively to one output port when its frequency is such that the phase difference between two input ports that are $2^{m-1}$ ports apart is an odd multiple of 90°. Thus, with the system illustrated in FIG. 2, where $m=3$, the input signal is delivered to output port 49 when the phase difference between adjacent input ports is $22\frac{1}{2}$° (90° between ports spaced apart by $2^{m-1}$). When the frequency of the input signal increases to $3f_1$, the phase difference between the signals delivered to adjacent ports is $67\frac{1}{2}$°; and the input signal is coupled exclusively to output port 45.

For the eight-port system illustrated in FIG. 2, $m=3$ ($2^3=8$), and $2_m{}^1=4$). The following table gives the phase differences between adjacent terminals 12 for which the input signal is transferred exclusively to an output port as indicated.

TABLE I

| Frequency | Output Port | Phase Differences Between Adjacent Terminals 12 |
|---|---|---|
| $f_1$ | 49 | $22\frac{1}{2}° = \frac{1}{16}$ 1 |
| $f_2$ | 45 | $67\frac{1}{2}° = \frac{3}{16}$ 2 |
| $f_3$ | 47 | $112\frac{1}{2}° = \frac{5}{16}$ 3 |
| $f_4$ | 43 | $157\frac{1}{2}° = \frac{7}{16}$ 4 |
| $f_5$ | 48 | $202\frac{1}{2}° = \frac{9}{16}$ 5 |
| $f_6$ | 44 | $247\frac{1}{2}° = \frac{11}{16}$ 6 |
| $f_7$ | 46 | $312\frac{1}{2}° = \frac{13}{16}$ 7 |
| $f_8$ | 42 | $337\frac{1}{2}° = \frac{15}{16}$ 8 |

In the above-described filter network, the input signal energizes a succession of input ports so that the phase difference between adjacent ports is a function of the frequency. A network of broadband transmission line couplers and phase shifters transfers the signals at the input ports to one or more output ports as described above with the amplitude of the signal at each output port depending on the phase difference between adjacent input ports.

While an eight-port network has been described above, it will be apparent that the basic network can be combined to double, quadruple, etc. the number of ports, to provide even greater frequency resolution. The resolution also depends on the distances between the taps on the input delay lines, and it will be apparent from the above that resolution increases with this distance.

Referring now to FIG. 1, as has been outlined, the output from input matrix 13 is a series of signals having distinct frequency characteristics. Each output from input matrix 13 is coupled to a respective narrow-bandwidth, high-frequency amplifier 50 through 57. As an example, the eight-port matrix of FIG. 1 is shown to cover a bandwidth from 2.6 to 5.4 gigacycles, which would have a center frequency of 4.0 gigacycles per second. The inputs of matrix 13 are driven from coupling taps 12 on delay line 10, which has a spacing between taps to give an unambiguous frequency response each 350 megacycles per second. The coupler values, as determined by directional couplers 61–68, are preferably such as to give cosine or $cosine^2$ amplitude taper, to hold down spurious frequency responses.

The coupling to delay line 10 can be varied for individual taps, in that the relative "capture area" of each tap on the delay line may be varied while maintaining equal spacing. Since the coupling distribution can be selected for individual applications, filter designs can be produced with any number of poles in the frequency response, any desired resolution, and any desired bandwidth between spurious responses.

A 16-element matrix filter bank has recently been developed to demonstrate the feasibility of this technique. The device consisted of a broadband 16-element matrix which could be excited from either of two delay lines. One delay line had a total delay of 9.4 nanoseconds, to yield a resolution of 100 mc./s.; and the other, a delay of 94 nanoseconds, to yield a resolution of 10 mc./s. The short line was coupled to the matrix with uniform excitation to demonstrate a single-pole response, and the long line was coupled to the matrix to provide a cosine amplitude taper, to demonstrate a two-pole response.

The composite response of the filter bank with the short delay line produced a bandwidth and peak separation of the individual beam port responses of about 100 mc./s.

A similar composite response for the matrix connected to the long line produced bandwidth and separation between beam peaks in this case of about 10 mc./s. A dramatic reduction in "side lobe response" resulted from the cosine tapered excitation of the matrix. Since the beam port responses are separated by 10 mc./s., the contiguous output of all ports covers a bandwidth of 160 mc./s. The matrix and delay line, however, have a useful bandwidth of over an octave. As a result, if the input signal is swept over a larger bandwidth, an individual beam port will exhibit ambiguous responses every 160 mc./s.

The outputs from amplifiers 50 through 57, inclusive, are coupled to a second transmission line network designated as output matrix 58, which is the reciprocal of input matrix 13. That is, the input ports of matrix 58 would be the output ports 42–49 of matrix 13, and the output ports of matrix 58 would be the input ports 14–21 of input matrix 13.

The filter network matrix is a reciprocal device, which means that a signal frequency exciting a particular frequency port will come out to a delay line 59 via a second set of couplers 69–76 in proper phases at the coupling taps thereof, to add up in phase at the end of the delay line.

The couplers and phase shifters employed in the matrices 13 and 58 can be built with greater than an octave of bandwidth, and matrices have been built to date with frequency responses up to 10,000 mc./s. The input matrix 13 can be fabricated in "strip line," such as shown in Patent No. 2,812,501, to D. J. Sommers for "Transmission Line," which has adequate power handling capability. For high-power applications, the output matrix would require a design in waveguide, coax, or "slab-line."

I claim:

1. Apparatus for amplifying broad-bandwidth input signals, comprising:

apparatus for delaying said broad-bandwidth input signals, said delay apparatus having a plurality of tapped outputs;

means coupled to said tapped outputs of said delay apparatus for separating said broad-bandwidth input signals into narrow-bandwidth components, said separating means having a plurality of input ports coupled to said tapped outputs and a plurality of output ports, whereby the energy appearing at any one of the output ports is dependent on the phase gradient across the input ports;

a plurality of amplifiers each having a bandwidth covering a different portion of said broad-bandwidth signal, one of said amplifiers being coupled to each of said output ports of said separating means;

means coupled to the outputs of said amplifiers for combining the amplified narrow-bandwidth components into a broad-bandwidth signal, said combining means having a plurality of input ports coupled to said amplifier outputs and a plurality of output ports, whereby the signal appearing at any input port will be coupled to all said output ports with a uniform phase difference between the signal thus delivered to said output ports; and a tapped delay apparatus having the taps thereof coupled to the output ports of said combining means, said tapered delay apparatus having a signal output terminal.

2. Amplifying apparatus as defined in claim 1, in which said separating means includes an electrical network having a plurality of paths of different electrical lengths between each input port and all of said output ports.

3. Amplifying apparatus as defined in claim 2, in which said combining means includes an electrical network having a plurality of paths of different electrical lengths between all said input ports and each output port.

4. Amplifying apparatus as defined in claim 3, in which said electrical networks each include 3 db couplers cross-connecting said paths.

5. Amplifying apparatus as defined in claim 4, in which unequal amounts of energy are coupled from said delaying apparatus to said separating means, thus providing amplitude tapering.

6. Amplifying apparatus as defined in claim 1, in which said separating means includes 3 db couplers and phase shifters interconnected so as to transfer signals from said input ports exclusively to one output port when the signals at input ports spaced $2^{m-1}$ input ports apart differ in phase by 90° $n$ where $m$ is a positive integer and the input matrix has $m$ input ports and where $n$ is an odd integer.

7. Amplifying apparatus as defined in claim 1, in which said delaying apparatus is arranged such that signals applied thereto will be coupled to said input ports of said separating means with equal amplitude at each input port and with a uniform phase difference between successive input ports.

References Cited

UNITED STATES PATENTS

| | | | |
|---|---|---|---|
| 2,195,152 | 3/1940 | Roux et al. | 330—124 X |
| 2,716,733 | 8/1955 | Roark | 333—75 |
| 2,904,682 | 9/1959 | Rawlins | 328—161 |
| 2,957,143 | 10/1960 | Enloe | 330—54 X |
| 3,129,387 | 4/1964 | Sosin | 330—54 |
| 3,218,569 | 11/1965 | Beck | 330—54 |

NATHAN KAUFMAN, Primary Examiner